May 6, 1941.　　　　C. E. IVES　　　　2,240,781
CONTROL MECHANISM
Filed April 23, 1938　　　2 Sheets-Sheet 1
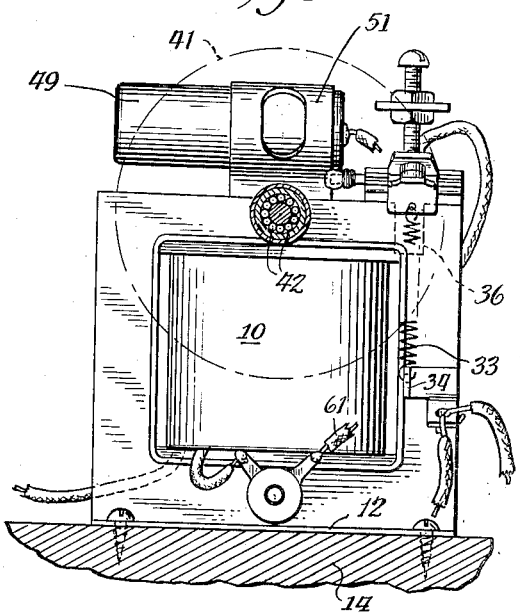
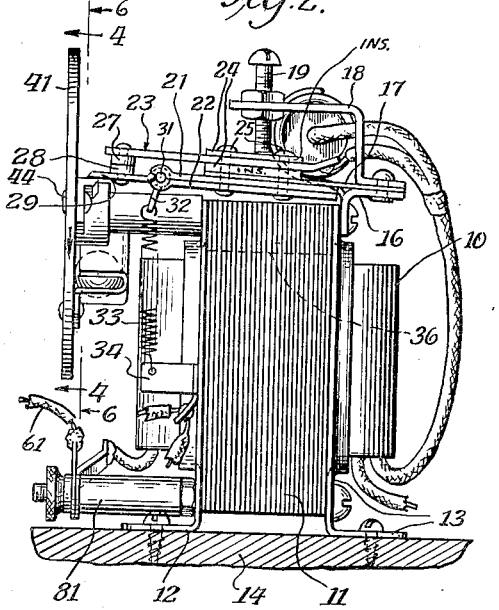
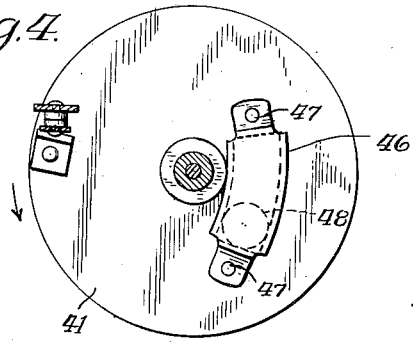
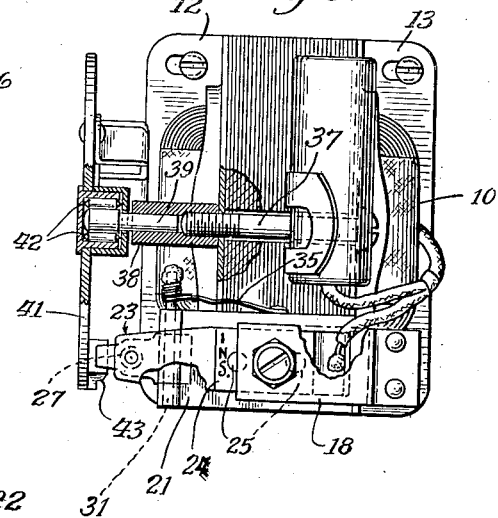
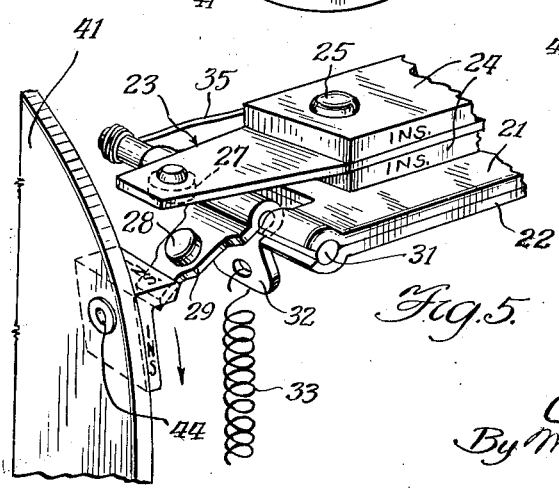
Inventor
Clifford E. Ives.
By McLaughlin & Wallenstein
Attorneys May 6, 1941.　　　　C. E. IVES　　　　2,240,781
CONTROL MECHANISM
Filed April 23, 1938　　　　2 Sheets-Sheet 2
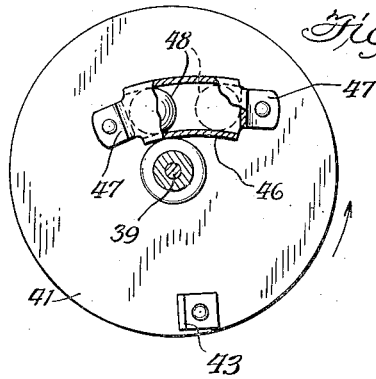
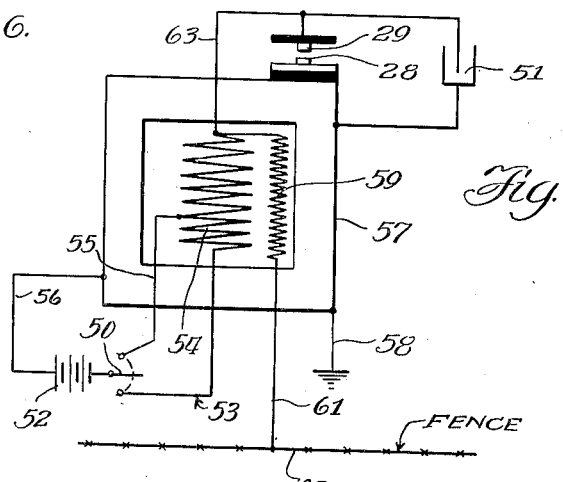
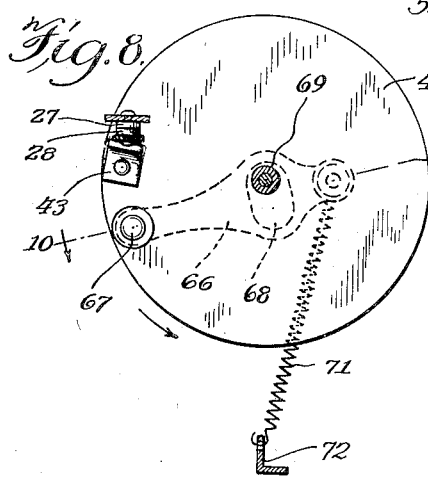
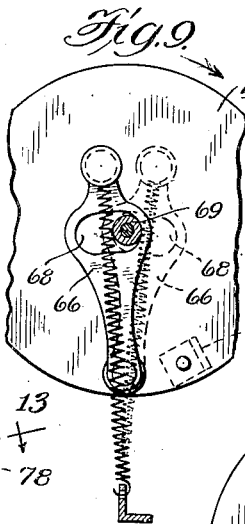
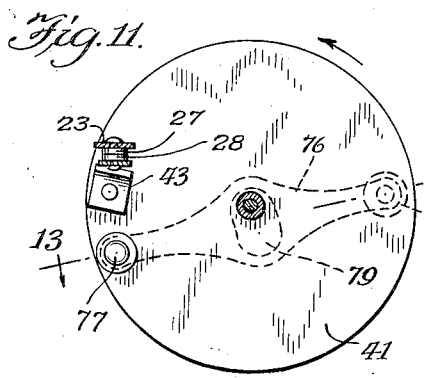
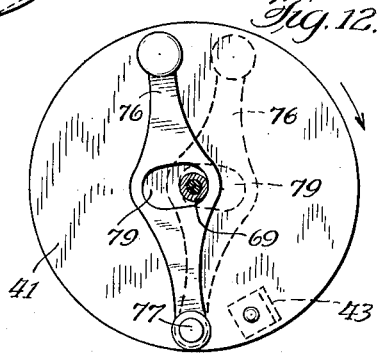
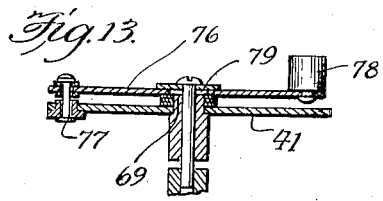
Inventor
Clifford E. Ives.
By McLaughlin & Hallenstein
Attorneys Patented May 6, 1941

2,240,781

UNITED STATES PATENT OFFICE 2,240,781

CONTROL MECHANISM

Clifford E. Ives, Chicago, Ill.

Application April 23, 1938, Serial No. 203,834

16 Claims. (Cl. 172—126)

This invention relates to electric fences. It relates more in particular to the kind of control and interrupter mechanism having particular utility in electric fence installations, but also capable of being employed in other places where it is desired to deliver current in a series of impulses.

Various suggestions have been made for charging a single wire or plurality of wires strung on the perimeter of a field in which animals are confined, all having for their objects to charge the wire or wires either continuously or preferably through a series of impulses with a current of relatively high voltage and low amperage such that the animal receives a sharp shock, but without injury, and learns shortly to keep away from the charged wire and, therefore, within the boundaries of the field. Since such fields are generally located a considerable distance from the sources of commercial current, and for other reasons, it is preferable to utilize battery current, and so it is highly important that the electric equipment employed be efficient to operate for long periods of time with low consumption of battery current, in all kinds of weather, and, in general, under the more or less diverse conditions usually encountered in open country. It is essential that the equipment employed be relatively inexpensive to produce, so that the initial expenditure should not be too great, and also that the upkeep be reduced to a minimum, particularly the item of upkeep, involving the purchase of renewal batteries.

The principal object of the invention is the provision of an improved electric fence.

Another object is the provision of an improved, simplified interrupter and current control mechanism particularly adaptable for use with an electric fence, but capable of being employed for similar or analogous purposes.

A further object is the provision of interrupter and current control mechanism which does not involve the utilization of oscillatory momentum devices and the like which, because of the balancing forces required, must be accurately designed and manufactured and therefore entail relatively large initial costs if they are to function satisfactorily under the unusual conditions in which electric fences are employed.

Other particular objects and features of the invention will be apparent to those skilled in the art from a consideration of the following description, taken with the accompanying drawings, wherein Fig. 1 is a front elevational view showing one embodiment of the invention, one of the parts being removed to facilitate a showing of mechanism lying behind it;

Fig. 2 is a side elevational view of the mechanism shown in Fig. 1;

Fig. 3 is a plan view, partly in section and partly broken away to illustrate structural features;

Fig. 4 is a sectional view taken on the line 4—4 of Fig. 2, looking in the direction of the arrows;

Fig. 5 is an enlarged fragmentary perspective view showing a feature of the operation of the mechanism;

Fig. 6 is a view, partly broken away, showing one of the members forming a part of the interrupter and current supply device, the position being such as to illustrate an operating characteristic;

Fig. 7 shows a basic circuit of the type which I prefer to employ when utilizing the interrupter and current supply device in combination with a fence;

Fig. 8 is a sectional view similar to that shown in Fig. 4. but illustrating a modified construction of the member there shown;

Fig. 9 is a fragmentary view of the same member illustrating the manner of its operation;

Fig. 10 is a sectional view taken on the line 10—10 of Fig. 8;

Fig. 11 is a view similar to Figs. 4 and 8 showing still another modification;

Fig. 12 is a generally similar view illustrating a characteristic of the operation; and Fig. 13 is a sectional view taken on the line 13—13 of Fig. 11, looking in the direction of the arrows.

In accordance with the general features of this invention, an electromagnet is employed having an armature so positioned as to be drawn to the electromagnet upon energization thereof. This electromagnet may comprise part of a transformer, the secondary of which is connected to ground and to the wire of the fence to be charged, although separate transformer means may, if desired, be utilized. Adjacent the armature, a body is provided moving in a closed path, continuously or substantially continuously in one direction, with means to permit such body to pass the armature when moving in its normal direction, but to engage the armature when its movement ceases. Means is provided for closing the circuit when this body engages the armature so that, in response to closing the circuit, the electromagnet is energized and actuates the armature to again drive such body through its closed path in the same direction until the energy imparted to it by the movement of the armature has been dissipated through friction, and conditions are established to give it another impulse through energization of the electromagnet.

In this way, the body continues to move in the same direction in a series of operations, each successive movement being accompanied with an electrical change wherein the current to the primary and secondary of a transformer flows momentarily, the circuit being broken so that no current flows during the major portion of the time that the body is in movement.

In the preferred form, as shown in the embodiments illustrated in the drawings, the body or actuator moving through the closed path comprises a projection on a member (such as a wheel or disk) which is free to rotate in a single direction about a free pivot, and means is provided to assure such operation that the body will at all times attain a rest position against the armature. Preferably, the contacts closed in response to reaching this position are carried by the armature, and, to permit the projection to pass the armature, at least one of these contacts is free to swing out of position as the projection passes it during its movement in the closed path heretofore referred to.

Referring now first to Figs. 1 to 6, inclusive, I provide an electromagnet comprising an induction coil 10, with a laminated pole piece structure 11, forming preferably a closed magnetic path, and having the general construction of a standard conventional transformer core, but modified slightly in a manner to be described. Plates 12 and 13 are mounted on opposite sides of the core 11 and form supports for attachment of the device as a whole to a suitable base 14, and for the assembly of remaining portions of the apparatus as will be pointed out. These plates, therefore, with the core 11, comprise a framework which, as will be made clear, may be grounded in order to establish such ground circuit connections as may be desired. Secured to the plate 13 is an angular bracket 16 carrying a spring armature member 17 (comprising part of an armature assembly), this spring being interposed between a portion of the bracket 16, and another bracket 18 carrying an adjustable stop screw 19. The spring armature member 17 has a pair of armature plates 21 and 22 secured on its underside, and on its upper side a plate 23. Insulating plates 24 are mounted on opposite sides of plate 23, and the entire assembly is stacked and secured together by means of suitable rivets 25 to produce a substantially integral armature structure. The spring armature member 17 is so disposed as normally to hold the armature assembly away from the core 11 substantially in the general position indicated in Fig. 2, that is to say, the position shown in the drawings is the rest position which the armature assumes when it is not attracted to the core 11.

The plate 23 extends forward of the plates 21 and 22, and carries a contact point 27. A cooperating contact point 28 is carried on a hinged piece 29 mounted on the ends of the plates 21 and 22. This hinged piece 29, as appears particularly clear from Fig. 5, has an extension 32, and an intermediate portion is pressed around a pin 31 held between the two arcuately formed ends of plates 21 and 22. The hinged piece 29, with its extension 32, has a general bell crank lever construction, the two arms of which are at an acute angle so that a spring 33 anchored at 34 which engages the extension 32 tends normally to hold the contact 28 out of engagement with contact 27. To cut down electrical resistance, a short conductor 35 has one end secured to an extension of the pin 31 and the other end, as indicated in Fig. 3, electrically securely attached to the two plates 21 and 22, thus electrically substantially securely connecting contact member 29 to the armature, and, as will appear, to ground. The contacts 27 and 28 control the flow of current to the coil 10 so that this coil is energized at the moment when these contact members are engaged. The operation will be referred to more fully hereinafter.

As previously noted, the core 11 is generally of the character employed in usual transformer practice, the magnetic flux following a closed path through the core, and the core being produced by combining together E- and I-shaped members, as those skilled in the art understand. Immediately beneath the armature assembly, however, the core is cut with a narrow slot extending approximately to the depth indicated by the dotted line 36 in Fig. 2, and also as indicated by the dotted lines in Fig. 1. This slot does not extend entirely through the affected section of the transformer core, some metal being retained to complete the magnetic path, but sufficient reluctance being established so that a greater proportion of the flux is available for attraction of the armature. In this way, efficiency is maintained in the transformer while still obtaining adequate attraction for operation of the armature. As the dotted lines in Figs. 1 and 2 indicate, the slot does not extend through the plates 12 and 13.

Approximately in the center of the transformer core, there is a shallow slot, large enough to accommodate a long screw 37, which is threaded into a non-magnetic, generally tubular support member 38. By bringing the screw up tightly this support member has its end face brought flush against the substantially vertical plate 12, so that the axis of the support member 38 is substantially horizontal when the device is in the positions indicated in the drawings. A stub shaft 39 is frictionally held in the tubular support member 38 to which a rotatable body, in the form of a disk 41, is supported through a frictionless bearing 42 of the ball-bearing or roller-bearing type. The disk or actuator 41 carries a block, stop or projection 43, here shown as a section of thermoplastic material or the like, secured by a rivet 44 (Fig. 5) to the disk, but obviously capable of having other forms; as, for example, it may be struck up from the material of the disk by a simple punch press operation. Substantially at 180 degrees from the projection 43 is a weight which will be more fully described in connection with refinements of operation. This weight has the function of bringing the projection 43 upwardly after it passes the hinged piece 29 to close the gap between the contacts 27 and 28, thereby, in a manner more fully set out hereinafter, establishing a circuit which energizes the electromagnet, causes the armature assembly (which in simple parlance may be termed a clapper) to move downwardly, and rotates the disk. Simultaneously, the contact is broken between the contact points 27 and 28, and the hinge arrangement, as indicated in Fig. 5, allows the projection 43 to pass the armature assembly a plurality of times depending upon the movement imparted to the actuator by the clapper.

While the device may operate for long periods of time with only a simple weight disposed substantially opposite to the projection 43, there is a possibility, notwithstanding the presence of the frictionless bearing 42 (particularly if the device does not set truly vertically as shown in Figs. 1 and 2), of the weight stopping at dead top-center and the operation of the device being arrested. I accordingly incorporate, with the weight means, a dead-center-preventing feature as particularly brought out in Fig. 6, but also apparent from a consideration of Figs. 2 to 4, inclusive.

Positioned slightly off from a 180 degree position from the projection 43, I support an elongated hollow body 46 against the face of the actuator disk 41, in the manner shown in the drawings, by rivets 47 extending through end pieces lying flat against the face of the disk. Within the body 46 I support a steel or similar ball 48. The arrangement is such that the ball has substantially no side movement but has sufficient clearance with the inside walls of the hollow body 46 as to permit its rolling freely from one end thereof to the other. The longitudinal axis of the hollow body 46 substantially coincides with a cord intercepting the circumference of the disk, and the center of the hollow body generally coincides with the center line bisecting the disk through its center. According to this arrangement, the ball will be either in the full position shown in Fig. 6 or in the dotted line position.

During the operation, the disk rotates substantially without interference from the ball, except that slight action, due to the unbalance caused by the off-center weight of the ball and its associated parts. Since the actuator disk does not rotate at a high rate of speed at any time, this unbalance is of no consequence. As the rotational movement decreases, a point is reached where the momentum is just about sufficient to carry the ball to the general position indicated in Fig. 6. At this point, the ball, being free to roll, will move to the full line position, with the movement of the disk substantially arrested and thereby impose a free weight beyond the center and at the left of the pivot point, and this weight is sufficient to carry the actuator disk approximately a three-quarter's turn or to a position slightly beyond that shown in Fig. 5 so that the hinged piece 29 is just cleared by the projection 43. The suspended weight will then be in the general position indicated in Fig. 4 with the result that the projection 43 will be drawn slightly upwardly a sufficient distance to cause engagement of the contact point 28 against the contact point 27. There may be occasion where, when the parts assume substantially the position shown in Fig. 6, the ball will fail to roll to the position shown in full lines in this figure, and, in this case, the ball will be at the other side of the dead-center and cause the disk to move in a direction opposite to the normal direction of rotation approximately a quarter turn, that is, far enough for the projection 43 to engage the under-side of the hinged piece 29 and close the associated contacts. This is not the normal action, but may occur if there is a tendency for the suspended weight to stop at true dead-center. In any event, the ball will roll at all times to one side of the center or the other so that the device will continue to operate.

The circuit preferably employs a condenser 49 which is mounted suitably by carrying it on a bracket 51 attached to the plate 13 as a frame member.

As already clearly brought out, the circuit employed may be modified extensively, but preferably battery current is utilized; the electromagnet operating the clapper comprises both turns of a transformer which steps up battery voltage to a considerably higher voltage for charging the fence; and a grounded circuit is employed so that an animal, brushing against the fence or close to it, completes the secondary transformer circuit through its own body and through ground. In Fig. 7, a preferred simple circuit is illustrated which will now be referred to.

A battery 52 has a conductor 53 connected to one end of a primary coil 54 through a switch 50, and another conductor or lead 56 connected to the frame 57 which is grounded at 58. Another conductor 55 leads to an intermediate turn of the primary, and is adapted for connection to the battery through the switch 50. A secondary coil 59 of the transformer has a lead 61 adapted to be connected to a fence 62. The opposite ends of the primary and secondary coils 54 and 59 are connected by a conductor 63 to the grounded frame 57 through the condenser 51. The contacts 28 and 27 are connected to the frame 57 (ground) and the conductor 63, respectively. Thus, the condenser is in shunt or parallel relationship to the contacts and becomes charged at the brief interval that the primary circuit is closed. When the circuit is again interrupted, the direction of flow of the current to the primary circuit is instantly reversed, causing a considerably greater impulse in the secondary circuit than if the condenser were not employed. Those skilled in the art will understand this function of the condenser and also the fact that the condenser further serves to prevent any tendency toward arcing which would cause the faces of the contact members to become pitted. In the arrangement which is disclosed, however, the faces of the contact members have a wiping contact, that is, when the hinged piece 29 comes up, a slight but very noticeable sliding action takes place, and this functions to keep the faces of the contact members bright and clean, even after long periods of operation.

The arrangement of the conductors shown in Figs. 1 to 3, inclusive, is such as to establish the circuit illustrated in Fig. 7. Accordingly, it appears unnecessary to describe these conductors in detail, since, for the most part, their relationship to the electrical parts of the device are clear from the drawings themselves. The switch indicated schematically in Fig. 7 is suitably mounted in a container housing the entire mechanism.

Reference may now be made to Figs. 8 to 10, inclusive, showing a modification of the dead-center-preventing mechanism described in connection with the main embodiment. In these figures, parts identical with those described in the main embodiment carry the same reference characters. In this form, the disk 41 carries the projection 43 adapted, in the same manner as described heretofore, to close the contacts 27 and 28. A lever 66 is pivoted at 67 and has a widened center section provided with a slot 68 extending around a hub 69. The opposite end of the lever 66 extends beyond the center of the disk 41 and has pivotally secured thereto a very light and relatively long coil spring 71, the opposite end of which is secured to a suitable projection 72 on a frame portion. As indicated in Fig. 9, the spring 71 imposes a load on the rotation of the disk generally substantially equivalent to that of the ball and associated parts shown in Fig. 6, so that, as the rotational movement of the disk is decreased, the tendency is for its motion to be arrested entirely at the point where the spring is extended the maximum amount, that is with the parts about in the position as shown in Fig. 9. At this point, the lever will tend to move to the position shown in dotted lines in Fig. 9 where the spring will impart further movement to the disk in the direction in which it has been rotating, with a result substantially identical with that described in connection with the main embodiment. Should the momentum not be sufficiently great to carry the parts to the position indicated in dotted lines, the furthest advanced position may then be as indicated in full lines in this figure, in which case the direction of rotation of the disk will be reversed for approximately one-quarter revolution, that is to say, until the parts assume the position shown in Fig. 8. In comparing these two figures, it should be noted, however, that Figs. 8 and 9 show opposite sides of the disk. Under no circumstances, however, will it be possible for the parts to become balanced in such a way as to permit maximum tension to remain on the spring with the arm 66 projecting directly upwardly in the dead-center position. The arm will always fall to one side or to the other, usually the dotted line position of Fig. 9. In all of these figures, the normal and usual direction of the movement of the disk is indicated by arrows.

Figs. 11 to 13, inclusive, make use of the same general principle as described in connection with Figs. 8 to 10, inclusive, with the exception that a weight is employed, making use of gravity in place of the spring in the previously described embodiment. In this form, an arm 76 is pivoted at 77 and has a weight 78 at its opposite end near the periphery of the disk. The arm is slotted at 79 to surround the hub, as in the previously described form, and the full and dotted line positions bear the same relationship to the full and dotted line positions described in connection with Fig. 9. The free weight 79, in other words, will tend to fall on one side or the other of dead-center, usually the position shown in dotted lines in Fig. 12, but in any event in such a way as to prevent any stoppage at dead-center such as to interrupt the operation of the device.

Those skilled in the art will readily understand, from the foregoing description, the manner in which the present invention operates in accordance with its intended purpose. The post 81 in Fig. 2 is conveniently arranged with a thumb nut for attachment of the conductor which leads to the wire of the fence. Its position close to the frame is adjusted to form a jump gap over which the current does not normally pass. Unusual voltage will jump the gap, however, and this construction, therefore, functions as a lightning arrester. The interrupter and control mechanism is set in any convenient location adjacent the fence and, while preferably it should be set in substantially a vertical position, it has the advantage of being operable when considerably off the vertical position in any direction. This is particularly true when the embodiment of Figs. 8 to 10, inclusive, is employed, as, in this embodiment, the mechanism may be set in substantially any position and continue to function without interruption. Those embodiments which depend upon gravity may also be tilted a considerable distance in the direction to the left or to the right as the device is pictured in Fig. 1, or to the left or to the right as the device is pictured in Fig. 2. It is, of course, essential that, in making the connections and in suspending the fence wire, as much leakage of current as possible be prevented. This can be taken care of by the use of suitable insulating means for the fence wire, and taking care that the conductor 61 be not grounded before it reaches its connection to the wire of the fence.

The mechanism of the present invention may employ suitable signals and indicator mechanism such as conventionally used with all electrical equipment, such as meters or suitably operated audible or visible signals. Furthermore, it is well known that the weather conditions may have a bearing upon the operation of an electric fence, so that, at times, the current delivered to the fence may be increased or decreased while still obtaining ample shock properties. As in conventional practice, any suitable means may be employed for securing this result, such as utilizing all or some of the turns of the transformer primary, as indicated in Fig. 7.

The mechanism of the present invention may be built quite small and light so that it is easily portable even with all of the batteries and other associated apparatus which may be employed with it. It may, therefore, be very suitably and inexpensively housed in any kind of a small water-proof container; it may be carried from one field to another and, in general, may be utilized with all of the advantages found to reside in light-weight, small equipment wherever employed. Notwithstanding its small size and inexpensiveness, it is positive in its action and will operate successfully for long periods without repair. In connection with its positive action, it should be understood that I mean positive in the sense that it will continue to operate although, because of the manner in which the circuit closing portion of the mechanism functions, the period of time between impulses may not be absolutely uniform. This does not interfere with its usefulness, however, since a difference of a few percent in the durations between impulses is of no importance in equipment of this general character primarily intended for the use described. Careful design and workmanship may result in producing substantially uniformly spaced electrical impulses, but such accuracy is by no means essential for most purposes.

It is clear that the mechanism described is self-starting under normal conditions. When the current is shut off, the projection 43 will come to rest against the hinged piece 29 and close the associated contacts. There it will remain, because there will be no power to energize the electromagnet. When the current is again turned on, however, the electromagnet will immediately become energized, and attract its armature to impart rotational movement to the rotating members, and thus initiate operation.

It must not be assumed that the invention is susceptible of employment only in the embodiment shown. Even when substantially the same structural parts are employed, their positions may be reversed. For example, the armature and electromagnet assembly may be reversed to propel the rotatable member in the opposite direction, the only change then required being a repositioning of the unbalancing means, so that the projection on the rotatable member would close the contacts by engaging above instead of below the armature assembly. For this reason, those claims which define the relative positions of the parts should be interpreted accordingly. Neither is it required that a pivot be employed to confine the moving body in a closed path, as other conventional means for securing this result may be employed. Finally, all embodiments described are merely illustrative of preferred forms of the invention, but the scope thereof is defined by the appended claims.

What I claim as new and desire to protect by Letters Patent of the United States is:

1. In an interrupter mechanism of the character described, an electromagnet, an armature associated therewith, a rotatable member, a projection on said member, and means associated therewith to produce a condition of unbalance and cause the said member to come to a stop with its said projection against one side of said armature, means for energizing said electromagnet when the said projection so engages the armature whereby to actuate the armature and rotate the said member including contact means carried by the armature and closed upon engagement of the projection with the armature, and means for permitting the said projection to pass the armature when rotating in the direction in which it is driven through energization of said electromagnet.

2. An interrupter mechanism as defined in claim 1, wherein said means to produce a condition of unbalance in the rotatable member includes mechanism for preventing the said rotating member from coming to rest at any position except one in which its said projection engages the armature.

3. An interrupter mechanism as defined in claim 1, wherein said rotating member comprises a wheel or disk, and wherein said means to produce a condition of unbalance therein comprises a weighted member spaced peripherally from the said projection.

4. An interrupter mechanism as defined in claim 1, wherein said armature carries a pair of contacts, one of which is supported on a hinge member to permit the said projection to pass when the rotatable member is rotating in its said single direction, said means for energizing said electromagnet comprising a circuit established through the closing of said contact members.

5. In an interrupter mechanism of the character described, a rotatable member, a projection on said member, means associated with the member for creating a condition of unbalance in the said member, an electromagnet, an armature associated therewith and positioned generally in the path of said projection, a contact member substantially rigidly secured to the armature but positioned to be cleared by the said projection, a second contact member normally spaced from the first-mentioned contact member and mounted to permit said projection to pass it when the member is rotating in one direction, said rotatable member, because of the unbalanced condition thereof, coming to rest against the second-mentioned contact member in such a manner as to engage the contact members, and means responsive to the closing of said contact members for energizing the electromagnet and actuating the armature whereby to impart rotational movement to the said rotatable member.

6. Interrupter mechanism as defined in claim 5, said unbalancing means being so located as to present said rotatable member from ceasing its rotational movement except in a position wherein its projection engages against said last-mentioned contact member to effect engagement of the contact members.

7. An interrupter mechanism as defined in claim 5, wherein said last-mentioned contact member comprises a hinged piece pivoted to swing toward and from the armature carried contact member and normally urged in a direction out of engagement with the armature carried contact member, said projection adapted to engage the said hinged piece when moving in its normal path whereby to cause the hinged piece to swing about its pivot out of the path of the said projection.

8. In an interrupter mechanism of the character described, an electromagnet, an armature associated therewith, a rotatable member, a projection on said member, a pair of normally spaced contact members carried by the said armature, one of which projects into the path of said projection, means for mounting the said contact member to permit it to move out of the path of the said projection when the said projection strikes one side thereof, said side being that which the projection strikes when the rotatable member is moving in one direction of rotation, said last-mentioned contact member moving into engagement with the second contact member when the said projection engages on the opposite side thereof during rotation of the rotatable member in the other direction, means associated with said rotatable member to cause it to come to rest with the said projection engaging the said opposite side of the contact member whereby to close the contacts, and means responding to the closing of said contact members for energizing the said electromagnet and actuating the armature, whereby to impart rotation to the said rotatable member in said first named direction of rotation.

9. In an interrupter mechanism of the character described, an electromagnet, an armature associated therewith, a rotatable member mounted to permit rotation continuously in a single direction, a projection on said member, a pair of normally spaced contact members carried by the said armature, one of which projects into the path of said projection, means for mounting the said contact member to permit it to move out of the path of the said projection when the said projection strikes one side thereof, said side being that which the projection strikes when the rotatable member is moving in the said single direction, said last-mentioned contact member moving into engagement with the second contact member when the said projection engages on the opposite side thereof, means associated with said rotatable member to cause it to come to rest with the said projection engaging the said opposite side of the contact member whereby to close the contacts, said means operating to impart a torsional force to the rotatable member and designed to prevent said force from being applied directly along the axis of rotation when applied in a generally downward direction, and means responding to the closing of said contact members for energizing the said electromagnet and actuating the armature, whereby to impart rotation to the said rotatable member.

10. An interrupter as defined in claim 9, wherein said means for causing the rotatable member to come to rest in the position described includes a weight having freedom of movement substantially along a line spaced from the axis of rotation of the rotatable member, said weight adapted to fall on either side of dead-center when the rotatable member tends to stop with the said weight in a position above the axis of rotation.

11. In an interrupter of the character described, a rotatable member, a projection on said member, a second member in the path of said projection permitting the projection to pass it when moving in one direction but functioning as a stop when the said projection moves in an opposite direction, means for imparting rotational movement to said rotational member when said projection is stopped by said second member, and means to cause said rotatable member to move in a reverse direction a sufficient distance to engage said projection against said second member after its normal direction of movement has ceased, said last-mentioned means including a shiftable load effective tangentially of the said rotatable member, said shiftable load being so supported as to shift to one side or the other of top dead center when the rotatable member ceases rotation with the said load at or near top dead center.

12. An interrupter mechanism as defined in claim 11, wherein said load forming a part of the said last-mentioned means comprises a weight mounted off center and supported to move generally along a path the extremes of which are generally equally spaced from the axis of rotation of the said rotatable member.

13. An interrupter mechanism as defined in claim 11, wherein said load forming a part of the said last-mentioned means comprises a lever pivoted off center on the rotatable member and projecting toward and beyond the center, a weight supported on the unpivoted end of said lever, and means for limiting the pivotal movement of the lever.

14. An interrupter mechanism as defined in claim 11, wherein said load forming a part of the said last-mentioned means comprises a lever pivoted off center on the rotatable member and projecting toward and beyond the center, a relatively long coil spring having one end pivotally secured to the unpivoted end of the lever, and the other end fixed at a position outside the periphery of the rotatable member.

15. A circuit interrupter comprising, a pair of contacts biased to disengagement and engageable to close the circuit, a rotatable actuator operable to effect engagement of the contacts in one direction of rotation and biased to a position effecting such engagement, and means rendered effective upon engagement of said contacts to rotate said actuator at least one complete revolution in a direction in which it is ineffective to engage the contacts thereby enabling the contacts to disengage and interrupt the circuit for the period of time during which the actuator rotates in said last named direction.

16. A circuit interrupter comprising, a pair of contacts, an actuator mounted for rotation in one direction to effect engagement of the contacts and for unlimited rotation in another direction without effecting engagement of the contacts, electromagnetic means for imparting a driving impulse to the actuator to cause the same to rotate at least one complete revolution in said second named direction, and means connected to the actuator for biasing the rotatable actuator to rotation in said first named direction for effecting engagement of the contacts after cessation of its rotation in the second named direction.

CLIFFORD E. IVES.